United States Patent [19]

Smith et al.

[11] 4,205,049

[45] May 27, 1980

[54] WATER INJECTION FOR CONTROL OF FINES FOR PRODUCING DEFLUORINATED PHOSPHATE ROCK GRANULES

[75] Inventors: Ronald J. Smith, Friendswood; Manuel A. Gonzalez, Houston, both of Tex.

[73] Assignee: Olin Corporation, New Haven, Conn.

[21] Appl. No.: 801,883

[22] Filed: May 31, 1977

[51] Int. Cl.[2] .......................... C01F 1/00; C01F 5/00; C01F 11/00

[52] U.S. Cl. .......................... 423/167; 423/305; 71/41; 71/44; 71/DIG. 3

[58] Field of Search .......................... 423/305, 307–313, 423/167; 71/DIG. 3, 41, 44

[56] References Cited

U.S. PATENT DOCUMENTS

| | | | |
|---|---|---|---|
| 2,562,718 | 7/1951 | Hollingsworth | 71/DIG. 3 |
| 2,997,367 | 8/1961 | Williams | 71/44 |
| 3,178,278 | 4/1965 | Manning | 71/DIG. 3 |
| 3,189,433 | 6/1965 | Hollingsworth et al. | 71/DIG. 3 |
| 3,264,086 | 8/1966 | Hollingsworth et al. | 71/41 |
| 3,514,255 | 5/1970 | Wiener | 423/310 |

*Primary Examiner*—Delbert E. Gantz
*Assistant Examiner*—Gregory A. Heller
*Attorney, Agent, or Firm*—William A. Simons; Thomas P. O'Day

[57] ABSTRACT

An improved process is described for preparing defluorinated phosphate rock (DPR) granules from fluorine-containing phosphate rock. In particular, the improvement is useful in conventional processes which comprise the steps of:

(a) admixing fluorine-containing phosphate rock, phosphoric acid, sodium carbonate, and water to form a non-granulated feed slurry;

(b) forming granules in a granulating zone from said non-granulated feed slurry;

(c) drying said granules in a drying zone;

(d) classifying said dried granules to form a product fraction, an over-size fraction, and a fines fraction of said granules;

(e) crushing said over-size fraction and recycling said crushed over-size fraction, said fines fraction and 0–95% by weight of said product fraction back to step (b);

(f) heating the unrecycled product fraction to defluorinate said fluorine-containing phosphate rock contained therein without fusion;

(g) recovering said defluorinated phosphate rock granules;

the improvement which comprises adding an aqueous solution to said granulation zone in a proportion equivalent to form about 5% to about 30% by volume of said non-granulated feed slurry, said aqueous solution being added only when more than about 20% by weight of dried granules discharged from said drying zone are less than about 20 mesh in size.

8 Claims, 1 Drawing Figure

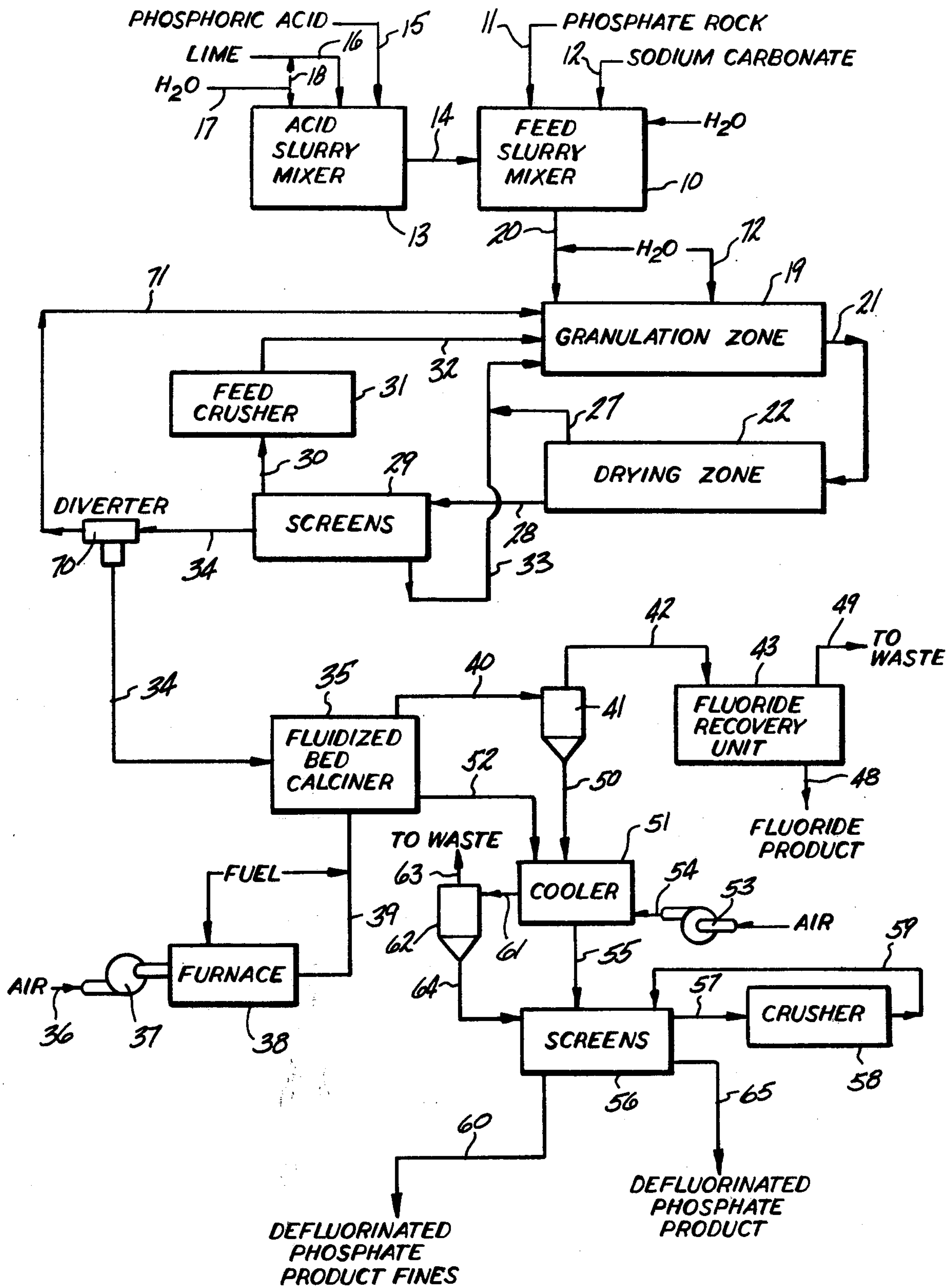

PHOSPHORIC ACID
LIME
$H_2O$
ACID SLURRY MIXER
PHOSPHATE ROCK
SODIUM CARBONATE
FEED SLURRY MIXER
$H_2O$
$H_2O$
GRANULATION ZONE
FEED CRUSHER
DRYING ZONE
DIVERTER
SCREENS
TO WASTE
FLUORIDE RECOVERY UNIT
FLUIDIZED BED CALCINER
FLUORIDE PRODUCT
TO WASTE
COOLER
FUEL
AIR
AIR
FURNACE
CRUSHER
SCREENS
DEFLUORINATED PHOSPHATE PRODUCT
DEFLUORINATED PHOSPHATE PRODUCT FINES

WATER INJECTION FOR CONTROL OF FINES FOR PRODUCING DEFLUORINATED PHOSPHATE ROCK GRANULES

BACKGROUND OF THE INVENTION

1. Field of the Invention

The present invention relates to an improvement in the process of making defluorinated phosphate rock granules.

2. Description of the Prior Art

Phosphate-containing materials are in great demand for use both as plant fertilizers and as animal feed supplements, and the market for such materials is constantly growing. The principal sources of phosphate in the United States are the great natural deposits of pebble rock and phosphate rock found in Florida and in the western states, and such widely distributed phosphatic materials as apatite. However, these naturally occurring phosphate materials contain combined fluorine in quantities which can, under certain conditions, interfere with the availability of the phosphate values when used as fertilizers and which are detrimental to health when used as animal feed supplements. As a result, when these phosphatic materials are to be used as fertilizers, and particularly when they are to be used as animal feed supplements, the phosphatic material is commonly treated to reduce the fluorine content of the material usually below a specified minimum amount. For instance, the fluorine content of an acceptable animal feed supplement today should be less than one part of fluorine per 70 parts of phosphorus by weight.

A great deal of effort has been devoted to the problem of developing economical and efficient processes for reducing the fluorine content of these phosphatic materials (herein collectively referred to as phosphate rock) to acceptable limits. Thermal processes have been the most widely known and commercially successful means of defluorinating phosphate rock. A typical thermal process involves calcining the phosphate rock in the presence of phosphoric acid, sodium carbonate, water vapor, and other reagents at a temperature in excess of about 1000° C. to drive off a substantial portion of the fluorine content of the rock and thereby obtain a defluorinated phosphate product. The principal difficulty encountered in the defluorination of phosphate rock by high temperature calcination arises from the fact that the temperature required for the removal of fluorine is so high that objectionable fusion or sintering of the rock can take place before removal of fluorine to the desired extent is effected. In order to avoid the disruption of the calcination process due to partial fusion and the consequent formation of large lumps of phosphate-containing material in the kiln or other calcining apparatus, it has heretofore been the practice to form the defluorination feed material into nodules, agglomerates, or granules having sufficient mechanical strength, porosity, and resistance to fusion to withstand calcination in a rotary kiln, and a great deal of time and effort have been expended in developing methods for making such a granulated feed material. The prior art practice of making defluorination feed material is exemplified by the processes described in U.S. Pat. No. 2,995,436 and U.S. Pat. No. 3,189,433 both issued to Hollingsworth et al, and co-pending U.S. patent application Ser. No. 761,049 filed Jan. 21, 1977 to Harold V. Larson.

The process disclosed in this latter reference represents a particularly useful technique for making defluorinated phosphate rock granules, especially from relatively low grade phosphate rock concentrates. That disclosed process is similar to the one shown by the FIGURE of the present application. As can be seen from the FIGURE, one feature of both that process and the present process is to recycle a portion of the dried granules (before calcining) back to the granulation zone to establish therein a bed of dried recycled solids which are sprayed with a wet feed slurry contained fine particles of fluorine-containing phosphate rock therein. The dry solids are thereby coated with relatively thin successive coatings of rock slurry, thus forming wet granules having a substantial portion of fluorine-containing phosphate rock therein. Each time a dry particle is recycled back to the granulation zone, the size of the dry recycled solids, thus, gradually increases. The principal mechanism by which this size-increasing is accomplished is called "layering" whereby the dry recycled solids act as nuclei for the smaller particles of phosphate rock contained in the wet feed slurry. In particular, for each pass through the granulation zone, one or more layers of these smaller phosphate rock particles form a layer around each dry nuclei. These new layers are held in place by the liquid present from the feed slurry and when the liquid is removed in the subsequent drying step, a new larger granule is formed. A more detailed discussion of this "layering" mechanism is found in an article by P. V. Sherrington entitled, "Liquid Phase Relationships in Fertilizer Granulation By A Layering Process" in the *Canadian Journal of Chemical Engineering*, Volume 47, pages 308–316, June, 1969.

Conventional granulation techniques for making defluorinated phosphate rock products exemplified by the processes disclosed in the above references are widely used by the fertilizer and animal feed industries today and relatively large commercial levels of granulated products are made. Under normal conditions, these processes operate quite smoothly and relatively good yields of product are obtained. However, occasionally these are upset by problems that are either beyond the control of the operators or caused by human error. One particular troublesome is the presence of an abnormally large percentage of very small-sized (for example, under −20 mesh) solid particles in the dryer discharge. As shown in the FIGURE, such fine-size particles are normally recycled back to the granulation zone, and therefore the excess fines cause lower yields in product because they are always recycled. Alternatively, if the excess fines are allowed to be fed into the calciner, more problems may be created. For instance, if fines are charged to the calciner, short circuiting across the fluidized bed or increased carry-over in the flue gas may also result. The short circuiting may cause decreased reaction time of the granules in the calciner with consequently higher fluorine in the product. Increased carry-over may result in more material passing by the cyclone and entering the scrubbers. This in turn may cause solids accumlations in the scrubber recycle liquor and excessive pump wear. In addition, high fines in the calciner feed may accelerate fouling of the calciner and thereby decrease unit on-stream time.

Furthermore, as will be discussed in detail below, while these problems of increased recycled fines and fines in the calciner feed are quite serious, what is even more troublesome about this excessive fines problem from the dryer is that once it starts, an increasingly large percentage of fines will discharge from the dryer unless a change in the process is made. If not corrected, eventually no granules will be produced and the whole system will be clogged with fines. This results in a major shutdown and a large loss in product. Therefore, a need exists in this art for means to correct this problem quickly when it occurs and return the process back to its normal rate of production. The present invention is such a solution.

BRIEF SUMMARY OF THE INVENTION

It has now been discovered that the above-discussed excess fines problem can be solved for conventional processes for making defluorinated phosphate rock granules which have the steps comprising:

(a) admixing fluorine-containing phosphate rock, phosphoric acid, sodium carbonate and water to form a non-granulated feed slurry;
(b) forming granules in a granulation zone from said non-granulated feed slurry;
(c) drying said granules in a drying zone;
(d) classifying said dried granules to form a product fraction, an over-size fraction and a fines fraction of said granules;
(e) crushing said over-size fraction and recycling said crushed over-size fraction, said fines fraction and from 0% to about 95% by weight of said product fraction back to step (b);
(f) heating the unrecycled product fraction to defluorinate said fluorine-containing phosphate rock contained therein without fusion; and
(g) recovering said defluorinated phosphate rock granules.

The present improvement to granulation processes having these steps is to add an aqueous solution to said granulation zone in a proportion equivalent to form about 5% to about 30% by volume of said non-granulated feed slurry fed to said granulation zone, said aqueous solution being added only when more than about 20% by weight of said dried granules discharged from said drying zone are less than about 20 mesh in size.

BRIEF SUMMARY OF THE DRAWING

The FIGURE is a schematic drawing of a typical fluidized bed calciner technique for preparing defluorinated phosphate rock granules showing the improvement of this invention.

DETAILED DESCRIPTION OF THE INVENTION

The present process employs as starting materials fluorine-containing phosphate rock, phosphoric acid, sodium carbonate, water, and preferably, other suitable reagents, to make defluorinated phosphate rock granules. Phosphoric acid, sodium carbonate, and water are additionally employed in these types of processes because each have known beneficial effects. See U.S. Pat. Nos. 2,839,377; 2,916,372; 2,995,436; 2,995,437; 3,058,804; 3,078,156; and 3,364,008 for detailed discussions on the effects of these reagents.

The fluorine-containing phosphate rock employed in this invention includes any of the usual commercial products from a phosphate rock mill or concentrator. Generally, fluorine-containing rock concentrates containing from about 65 to about 78% BPL (Bone Phosphate of Lime) by weight and up to about 10% by weight acid insolubles (i.e., principally silica) can be employed herein. Such fluorine-containing rock normally also contains from about 0.5% to about 4% by weight fluorine, and, preferably, less than about 1.5% by weight each of $Al_2O_3$ and $Fe_2O_3$. However, fluorine-containing phosphate rock from other sources may be satisfactorily defluorinated in accordance with the process of this invention.

Suitably, all of the fluorine-containing phosphate rock of the present invention is generally less than about a 35 mesh Tyler standard screen. More preferably, a maximum of about 18% by weight of the fluorine-containing phosphate rock feed is retained in a 100 mesh screen and a minimum of about 50% by weight passes through a 200 mesh Tyler standard screen. All screen sizes presented throughout the specification and claims herein in terms of "mesh" refer to Tyler standard screens.

The phosphoric acid suitable for use as a reagent in the present invention may be any conventional wet process phosphoric acid such as one having a $P_2O_5$ concentration in the range from about 24 to about 32% by weight and containing less than about 25% by weight of non-volatiles impurities based upon the $P_2O_5$ contents. The phosphoric acid may be previously defluorinated, but need not be, since removal of the fluorine can be substantially effected by the subsequent heating step in the process of this invention.

In particular, crude commercial phosphoric acid resulting from reacting sulfuric acid with a phosphate-bearing material (e.g., phosphate rock) is a satisfactory form of phosphoric acid. While the concentration of the phosphoric acid employed herein is not critical, it should be sufficiently high to avoid unduly increasing the moisture content of the aqueous starting mixture. Alternatively, other acid phosphate compounds such as acidic sodium salts of phosphorus acids can also be successfully employed instead.

The sodium carbonate employed as a reagent herein can be any commercially available product. The sodium carbonate is employed primarily as a preferred source of sodium and it should be recognized by those skilled in the art that other sodium compounds, such as sodium phosphate, sodium nitrate, sodium formate, sodium chloride and the like may be used to replace part or all of the sodium carbonate component. It will be recognized by those skilled in the art that the term "sodium carbonate" as used throughout the description and claims is intended to include any compound capable of providing $Na_2O$ under the reaction conditions obtained without adversely affecting the process. The preferred source of sodium carbonate for the present invention is commercially available soda ash which contains greater than 99% by weight $Na_2CO_3$ (58% by weight $Na_2O$) and substantially all of the particles pass through a 35 mesh screen.

Sufficient water is added to be reagents to provide an aqueous non-granulated feed slurry of fluorine-containing phosphate rock, phosphoric acid, and sodium carbonate. This slurry normally will have a specific gravity in the range of from about 1.80 to about 2.00 and preferably from about 1.85 to about 1.95, and a water content in the range of about 25% to about 30% by weight. All or part of the water can be added with any of the three reagents or separately. The water employed to make up this aqueous slurry can contain minor impurities such as fluorine and aluminum as well as calcium and phosphate values. Therefore, aqueous waste streams from other phosphate processes may be employed herein.

Other reagents conventionally employed in making defluorinated phosphate rock can be also used in the present invention. Specific examples of these include lime and calcium carbonate. In particular, it is preferable to first combine lime or a suitably limeforming substance with the phosphoric acid reagent and then add this mixture to the other reagents. This concept is discussed in detail in the co-pending U.S. patent application Ser. No. 761,049 filed on Jan. 21, 1977 to Harold V. Larson. This patent application is incorporated completely herein by reference. Calcium carbonate may also be used as a source of lime but the excess foaming in mixing the slurry containing this compound must be dealt with.

The prior art discloses numerous formulations and operating conditions for effecting defluorination of phosphate rock without fusion. For example, U.S. Pat. Nos. 2,893,834; 2,995,436; 2,995,437; 3,189,433; 3,292,995; and 3,364,008 as well as the above-mentioned U.S. patent application Ser. No. 761,049 each present formulations for preparing granular feed for the defluorination of fluorine-containing phosphate rock.

In particular, it is preferred to prepare a non-granulated feed slurry in which the weight ratio of CaO to $P_2O_5$ therein is in the range from about 1.01:1 to greater than about 1.06:1, depending on the amount of the acid insolubles and other impurities present in the phosphate rock and the other reagents. A suitable mixture of reagents that may be utilized to form the non-granulated feed slurry, employing relatively pure phosphate rock concentrate feed (above about 72% by weight BPL and less than about 6% by weight acid insolubles) will have proportions given in the following table:

TABLE I

| Component | Parts by Weight |
|---|---|
| High Grade Phosphate Rock Concentrate | 540–550 |
| Sodium Carbonate | 40–65 |
| Phosphoric Acid (24 to 32% by weight) | 200–295 |
| Water | 100–140 |

Moreover, when less pure phosphate rock, such as rock containing in excess of 6% by weight up to 10% by weight of acid insolubles, is employed as a starting material, additional phosphoric acid and lime as taught in co-pending U.S. patent application Ser. No. 761,049 may be also added. However, it should be understood that the present invention should not limited to any particular proportion of reagents since the invention is primarily directed to controlling the amount of recycled fine particles during the granulation and drying steps. Therefore, any proportions of reagents which when employed may result in this excess fines problem are encompassed by the present invention.

More in detail, a preferred embodiment of the present invention is illustrated in schematic form in the FIGURE. Feed slurry mixer 10, which is a suitable tank or other vessel provided with agitation means, is used to prepare the non-granulated feed slurry of fluorine-containing phosphate rock and other reactants. Phosphate rock, which is generally a fluorine-containing concentrate containing from about 65 to about 78% BPL by weight and up to about 10% by weight acid insolubles, and having a particle size all of which passes through a 35 mesh Tyler standard screen, is fed from a suitable hopper (not shown) through rock feed line 11 to feed slurry mixer 10. It is preferred to employ Florida phosphate rock, which generally contains less than about 1.5% by weight of $Al_2O_3$ and less than about 1.5% by weight of $Fe_2O_3$. However, phosphate rock from other sources, which are generally less pure than Florida phosphate rock concentrates, may be defluorinated satisfactorily in accordance with this preferred embodiment.

Sodium carbonate from a suitable hopper (not shown) is also fed to feed slurry mixer 10 through sodium carbonate feed line 12. The sodium carbonate employed in preparing the feed slurry is generally commercially available soda ash which contains greater than 99% by weight $Na_2CO_3$ (58% by weight $Na_2O$) and substantially all of the particles pass through a 35 mesh screen.

Acid slurry mixer 13, which is a suitable tank or other vessel provided with agitation means, is used to prepare an acid slurry for feeding to feed slurry mixer 10 through acid slurry feed line 14. The acid slurry is prepared by mixing phosphoric acid, lime, and water in acid slurry mixer 13. Any phosphoric acid as defined above can be utilized herein. The phosphoric acid is stored in a suitable vessel (not shown) and fed through phosphoric feed line 15 to acid slurry mixer 13.

Lime or a suitable lime-forming substance is conveyed from a suitable hopper or tank (not shown) through lime feed line 16 to acid slurry mixer 13. Sufficient water is added to acid slurry mixer 13 through water feed line 17 to provide a slurry of phosphoric acid, lime, and water having a specific gravity in the range of from about 1.20 to about 1.50, preferably from about 1.35 to about 1.38. If desired, a portion or all of the water can be added with the phosphoric acid. Alternatively, a portion or all of the water may be used to pre-form an aqueous lime slurry by conveying water from water feed line 17 through lime slurry water line 18 (shown in dotted form in the FIGURE) to lime feed line 16. Generally, such aqueous lime slurries have specific gravities in the range from about 1.1 to about 1.4 and preferably from about 1.2 to about 1.35. Furthermore, water may be instead added to the lime hopper (not shown) and the resulting aqueous lime slurry is conveyed through lime feed line 16 to acid slurry mixer 13.

The lime-phosphoric acid slurry, sodium carbonate, and phosphate rock (and more water, if desired) are admixed in feed slurry mixer 10 in proportions described more fully above and in Table I, and the resulting slurry is conveyed to granulation zone 19 through feed slurry feed line 20. Granulation zone 19 may be any suitable granulating or pelletizing device, such as a rotary granulater, blunger, pug mill, or the like, which is capable of mixing and layering in granular form the components of the slurry on recycled solids from sources described more fully below. In particular, a bed of dry recycled solids is established in granulation zone 19 and the slurry from feed slurry mixer 10 is conveyed through feed slurry line 20 to a suitable nozzle or nozzles (not shown) in granulation zone 19 where the feed slurry is sprayed onto the moving bed of dry recycled solids. By this technique, the dry solids are coated with relatively thin successive coatings of the feed slurry, thereby forming wet granules containing a substantial portion of fluorine-containing phosphate rock. The size of these granules increases as they pass through granulation zone 19 and are conveyed through granulation zone discharge line 21 to drying zone 22.

Drying zone 22 may be any suitable dryer, such as a rotating dryer, fluidized bed dryer, or shelf dryer, capable of reducing the water content of the granules to the desired range. Generally, the free water content of the wet granules fed through granulation zone discharge line 21 can range from about 2% by weight to about 7% by weight, and in turn, the free water content of the dried granules in drying zone discharge line 28 can range from 0% to about 1% by weight and the trapped or crystalline water content of the dried granules may be from 0% to about 3% by weight. If desired, the granulating and drying steps may be combined into a single granulator-dryer unit (not shown). Drying zone 22 may also be provided with a suitable dust collection means (not shown) which is capable of collecting finely divided phosphate rock particles, sodium carbonate, and the like, and conveying them through fines recycle line 27 to granulation zone 19.

The dry granules are conveyed from drying zone 22 through drying zone discharge line 28 to a suitable solids classification system such as that represented by screens 29. The classification screens 29 generally separates the dried granules into three fractions, i.e., product fraction, a fines fraction, and an over-size fraction. The product fraction may have a particle size in the range of −8+18 mesh, and preferably, in the range of −10+16 mesh, but coarser or finer size ranges may be employed. For example, the product fraction may have a large size range such as from −4+40 mesh or a narrow size range such as −10+14 mesh. The over-size fraction consists of granules whose size is larger than upper mesh-size limit of the product range. The fines fraction consists of granules whose sizes are smaller than the lower mesh-size limit of the product range. Under normal operations when the product size is −10+16 mesh, the product fraction of the drying zone discharge is from about 65% to about 80% by weight. The over-size fraction is normally from about 2% to about 10% and the fines fraction is normally from 20% to about 25% of the dryer discharge. In this normal fines fraction, about 15–20% by weight is of a size between −16+20 mesh and about 5–10% by weight is less than 20 mesh, said percentages based on amount of drying zone granule discharge.

After passing through the screens 29, the over-size fraction is conveyed through over-size fraction discharge line 30 to a feed crusher 31 or other crushing apparatus such as an impact mill. Feed crusher 31 generally communicates the over-size fraction until all of the particules are of a product fraction size or fines fraction size. The resulting comminuted particles are recycled through feed line 32 to granulation zone 19.

The fines fraction separated in screens 29 is conveyed through fines fraction recycle line 33 to also help establish a moving bed of dry recycled solids in granulation zone 19. If desired, a portion of the product fractions also may be conveyed by means of diverter 70 through a granulation zone 19 to further help establish this moving bed of recycled solids. This portion of the recycled product fraction may be from 0% to about 95% by weight, preferably from about 50% to 90% by weight. Instead of having three separate lines returning these recycled solids to the granulation zone 19, there may be one line and the three fractions may be combined before entering the granulation zone 19. In any event, the feed ratio of total recycled solids to solids in the feed slurry may range from about 11:1 to about 17:1. More preferably, in the range of from about 14:1 to about 16:1.

Under normal operation, the portion of dried granules discharged from the drying zone that is under 20 mesh in size is no more than about 5–10% by weight of the discharged solids. However, certain process upset conditions can cause this percentage of −20 mesh particles to raise considerably. In particular, this rise in the amount of −20 mesh fines may be caused by various upset conditions such as an uncontrolled upward drift in the ratio of CaO to $P_2O_5$ in the nongranulated feed slurry, failure to regulate the water in that slurry, not having a uniform feed slurry fed into said granulation zone, or the like. But, whatever the cause of these excess −20 mesh fines in the drying zone discharge, the program is serious and must be corrected as quickly as possible. Otherwise, there is a substantial risk that the whole rock defluorination system will have to be shut down.

In accordance with the present invention, it has been found that this excess −20 mesh fines condition can be corrected without shutting down the whole system. This process correction is to simply add an aqueous solution, preferably water, to the granulation zone when the amount of −20 mesh fines leaving the drying zone exceeds 20% by weight of the solids discharged. The amount of the aqueous solution should be in the range of from about 5% to 30%, and preferably from about 10% to about 20%, by volume of the non-granulated feed slurry. Aqueous solution injection rates below about 5% by volume of the non-granulated feed slurry are not effective. Likewise, aqueous solution injection rates above about 30% by volume of the non-granulated slurry are not commercially desirable because the water content in the feed to the drying zone would be so high that normal drying capacity could not handle the excess water.

In a preferred embodiment of the present invention, this aqueous solution can be added directly to the granulation zone as by feed line 72 through a nozzle or nozzles (not shown) above said zone. Alternatively, the aqueous solution can be added to the non-granulated feed slurry as shown by feed line 72 which is then added to the granulation zone. Moreover, if added to non-granulated feed slurry 20, the resulting water content of that slurry will be preferably increased to from about 30% to about 35% by weight. Besides water, which is the major constituent of the aqueous solution, water-soluble salts or compounds such as phosphoric acid or monosodium phosphate solution can be added as this aqueous solution. Thus, the $CaO:P_2O_5$ or $Na_2O:P_2O_5$ ratios can be fine-tuned continuously by the process of this invention.

One of the discernible results of the present invention is that an increased amount of the finesized solids in the granulation zone are solubilized in water. It is believed this is an important effect in correcting these high-fines process upsets. The reasons for this theorized conclusion are that, one, it is believed that the principal mechanism for making granules in the normal defluorination processes is by the so-called "layering" mechanism. However, it is further believed that when a high −20 mesh fines concentration (i.e., above 20% of discharged solids from the drying zone) is present in the drying zone discharge, the "layering" mechanism cannot proceed effectively because the particles under 20 mesh size cannot act as nuclei for the solid particles entering the granulation zone from the feed slurry. Therefore, larger layered particles cannot be formed and instead, these −20 mesh fines are repeatedly recycled through the granulation zone and drying zone, and product-size granules are not formed in large number. Furthermore, because a large number of fine particles are entering the granulation zone from the non-granulated feed slurry, the number of fines is ever increasing and the risk of clogging the system with fine particles grows increasingly greater with time.

Therefore, it is believed that by increasing the amount of water-solubilized fines in the granulation zone by addition of more water, an alternative mechanism for granulating will become the primary way of making granules. This alternative granulation mechanism is called "agglomeration", whereby two or more particles (independent of size) attach to each other to form a larger particle or granule. Therefore, it is believed that the present invention temporarily changes the primary mechanical mechanism for granulating from "layering" to "agglomeration". However, since "agglomeration" requires more water than the "layering" mechanism and produces granules which are weaker than by "layering", it is not desirable to continue to granulate by this method longer than necessary. Therefore, the water addition is stopped as soon as the −20 mesh fines percentage returns to about 20% or less by weight of the drying zone solids discharge. However, it is not certain that this is the primary reason for the beneficial results of the present invention and it should be understood that the present invention should not be limited to this theory.

Returning to the discussion based on the Figure, the unrecycled product fraction is conveyed through product feed line 34 to fluidized bed calciner 35. In the operation of fluidized bed calciner 35, air is conveyed from air feed line 36 or other air source through a suitable blower 37 to furnace 38 where it is mixed with combustion gases to form a gaseous mixture containing air and water vapor having a temperature in the range of from about 530° C. to about 880° C., and preferably from about 620° C. to about 700° C. This gaseous mixture is conveyed through combustion gas feed line 39 to the bottom of fluidized bed calciner 35 where it is admixed with a suitable fuel such as natural gas. Combustion of this mixture in fluidized bed calciner 35 produces a heated combustion gas containing water vapor in the range from about 15 to about 20 percent by weight, which fluidizes the product feed fraction fed to calciner 35.

Defluorination of the dry granules of unrecycled product fraction in fluidized bed calciner 35 is generally obtained by heating the granules to a temperature in the range from about 980° C. to about 1350° C. and preferably from about 1260° C. to about 1290° C. Hold-up time for the solids under these conditions in the fluidized bed calciner 35 generally ranges from about 3 to about 10 and preferably from about 4 to about 5 hours. Exhaust gases are removed continuously from fluidized bed calciner 35 through exhaust gas line 40 which conveys the gases to cyclone 41 or other suitable solid-gas separation units. The exhaust gases from fluidized bed calciner 35 not only contain finely divided particles of phosphate rock, soda ash, and the like, but also contain fluoride impurities in gaseous form. Cyclone 41 separates these components of the exhaust gas and conveys the fluorine-containing gases through fluorine gas line 42 to fluoride recovery unit 43. In fluoride recovery unit 43, the fluorine gases are scrubbed with water in the presence of a dilute hydrogen fluoride solution to form a more concentrated aqueous hydrogen fluoride solution, which is removed through fluoride product line 48. Exhaust gases from fluoride recovery unit 43 are conveyed through exhaust gas line 49 to waste.

After the above heating step, the defluorinated phosphate rock is recovered by the following steps of cooling and screening. Finely divided particles of defluorinated phosphate rock removed in cyclone 41 are conveyed through cyclone discharge line 50 to cooler 51. In addition, solids from fluidized bed calciner 35 are conveyed through solids discharge line 52 to cooler 51. Air from a suitable source is conveyed through cooler blower 53 through cooler air line 54 to cooler 51 where the hot solids from fluidized bed calciner 35 are cooled to a temperature of less than about 150° C., and preferably below about 75° C. Cool solids from cooler 51 are conveyed through cooler product line 55 to product screens 56 or other suitable solids classification equipment. Product screens 56 separate the cooled product into three fractions, i.e., a coarse fraction, a fine fraction and a defluorinated phosphate product fraction.

The coarse fraction, which is generally retained on about a 6 mesh screen is conveyed through coarse product discharge line 57 to product crusher 58 or other suitable comminution device, where the coarse product is comminuted to pass a 10 mesh screen. The comminuted product is conveyed through comminuted product line 59 to product screens 56.

The fine fraction of defluorinated phosphate product is conveyed from product screens 56 through defluorinated product fines line 60 to storage for use as a component on animal feeds. In addition, fine particles of defluorinated phosphate product are separated from cooler 51 through cooler fine fraction line 61, and are conveyed to product fines cyclone 62. Exhaust gases from product fines cyclone 62 are discharged through cyclone exhaust line 63 to waste. Product fines are discharged from product fines cyclone 62 through product fines discharge line 64 and conveyed to product screens 56.

The defluorinated phosphate product fraction from screens 56 may be any desired size suitable for animal feed components. Generally, the product fraction is in the range −10+200 mesh, but a product fraction within the range −10+20 mesh is preferably obtained. If desired, fines (−200 mesh) up to about 5 percent by weight may be included in the product fraction.

The defluorinated phosphate product fraction from screens 56 and the defluorinated phosphate product fines fraction from screens 56 each contain less than about 1 part fluorine per 70 parts of phosphorus by weight. When necessary to provide acceptable animal feed, these products may contain at least 18% by weight phosphoric acid content.

The following example is presented to define the invention more fully without limiting the scope of the invention. All parts and percentages are by weight unless otherwise specified.

EXAMPLE I

The process improvement of the present invention was employed to correct a process upset on the following defluorination process. The conditions of the normally run process are given below.

The process of this invention was employed to defluorinate a fluorine-containing phosphate rock having the following approximate analysis:

TABLE II

| Component | % by Weight |
|---|---|
| $P_2O_5$ | 33.0 |
| CaO | 48.0 |
| $Al_2O_3$ | 0.8 |
| $Fe_2O_3$ | 1.1 |
| A.I.* | 6.5-8.75 |
| $R_2O_3$** | 1.3 |
| Non-Volatiles*** | 90.70-92.95 |
| $H_2O$ | 1.0 |

*Acid insolubles by the Boric-Perchloric Technique - mainly silica and silica-phosphate complexes.
**Miscellaneous metal oxides, other than iron and aluminum oxides.
***Non-volatiles = sum of the above items.

Employing a defluorination system of the type shown in the Figure, a lime-phosphoric acid slurry was prepared in acid slurry mixer 13 from an aqueous lime slurry and phosphoric acid. The aqueous lime slurry of $Ca(OH)_2$ had a specific gravity of 1.280. The phosphoric acid had an approximate analysis as set forth below in Table III.

TABLE III

| Component | % By Weight |
|---|---|
| $P_2O_5$ | 29.3 |
| CaO | 1.0 |
| $Al_2O_3$ | 0.8 |
| $Fe_2O_3$ | 1.1 |
| $SiO_2$ | 1.2 |
| $Na_2O$ | 0.2 |
| Non-Volatiles* | 33.6 |
| $H_2O$ | 49.5 |
| $H_2SO_4$ | 2.0 |

*Non-Volatiles = sum of the above items.

Sufficient aqueous lime was admixed with the phosphoric acid to provide a CaO to $P_2O_5$ weight ratio of 0.08:1 in the resulting lime-phosphoric acid slurry.

This acid slurry was added to feed slurry mixer 10 at a varying rate of about 240-290 parts per hour, along with about 540-550 parts per hour of the above-identified fluorine-containing phosphate rock, about 40-65 parts per hour of sodium carbonate, and about 100-140 parts per hour of water. The resulting non-granulated feed slurry containing about 27.5 percent water by weight and having a $CaO/P_2O_5$ weight ratio of about 1.025-1.050. Moreover, this slurry had a pH of about 5.0-5.5 and a specific gravity of about 1.890-1.910.

This non-granulated feed slurry was fed to granulation zone 19, which was a blunger having two rotating shafts with perpendicular spikes. The blunger admixed a bed of previously prepared dry granules of phosphate rock particles (recycled solids) with the feed slurry from feed slurry mixer 10, which was fed to the blunger at a rate of from about 20-35 gal/min. The temperature of the mixture in the blunger was approximately 60°-70° C. and the weight ratio of recycled solids to solids in the slurry was about 14-16:1.

The resulting wet granules from the blunger (about 6% by weight water) were charged to a rotary dryer heated by co-current flowing air having an inlet temperature averaging about 450° C. and an outlet temperature averaging about 90° C. The free water content of the dry particles was about 0.5% by weight and total water content (containing trapped or crystalline water) was about 3% by weight.

The dry granules were classified by screening to separate out a product fraction having a size of −10+16 mesh. The over-sized particles larger than 10 mesh were crushed in an inpact mill whereby approximately all of the crushed over-size had a reduced size of less than 16 mesh. This crushed over-size amounted to about 2-10% by weight of the solids discharged from the dryer. The fines fraction amounted to 20-25% by weight of the dryer discharge. About 15-20% of the dryer discharge was in the size range of −16+20 mesh and about 5-10% by weight was in the size range of −20 mesh. The product fraction amounted to about 65-80% by weight of the dryer discharge.

The product fraction was fed into a gate-type diverter 70 wherein about 90% by weight of this fraction was diverted back for recycle into the blunger. The crushed over-size fraction, fines fraction, and diverted products fraction were combined together to form one recycle feed stream. As stated above, the weight ratio of recycled solids to solids in the feed slurry was about 14-16:1.

The undiverted product fraction was fed to a fluidized bed calciner 35 employing air at a pressure of 5 to 6 psig and temperature of about 650° C. for combustion with natural gas. The combustion gases used for fluidizing the bed had a temperature of from 1260° C. to about 1320° C. and flowed through the bed at the rate of about 5 to about 7 feet per second. The average retention time of the dry granules in the fluidized bed calciner 35 was from about 4 to about 5 hours.

Effluent gas from the fluidized bed calciner 35 was conveyed to cyclone 41 and the resulting gas was conveyed to a fluorine recovery unit. The separated dust particles were conveyed to a cooler 51 along with the defluorinated solid particles removed from the central portion of fluidized bed calciner 35.

In cooler 51, the defluorinated phosphate rock particles were quickly cooled to a temperature below about 420° C. The resulting defluorinated phosphate rock particles were relatively porous, having a density ranging from about 50 to about 70 pounds per cubic foot. From 70 to 90% of the particles passed through a 6 mesh screen. By rescreening crushed over-size, substantially all of the rock was removed as −16+20 mesh defluorinated phosphate rock granules. The remainder of the particles were recovered as finely divided defluorinated phosphate rock fines which were also useful as an animal feed. The phosphorus content of the defluorinated phosphate rock product was 18.01% and the fluorine content ranged from 0 to 0.24% over a two-month period. The available $P_2O_5$ content, as determined by solubility in hydrochloric acid, was 98.79%, as determined by solubility in citric acid was 98.65%, and as determined by solubility in neutral ammonium citrate was 90.31%.

In the course of normal operation of the above process it was suddenly discovered that the proportion of particles having a size that would pass through a 20 mesh screen amounted to approximately 75% by weight of the solids discharged from the drying zone 22. This process upset was believed to be caused by uncontrolled drift in the $CaO:P_2O_5$ ratio in the feed slurry. Water was injected into the non-granulated feed slurry at a rate of 15% by volume of the rate of the slurry. After about 2½ hours, this −20 mesh fraction of the dryer discharge was determined to be lowered to 61% by weight. Water injection was continued at a rate of between about 10% and about 15% by volume of the feed slurry for another 4½ hours until the amount of −20 mesh fines amounted to only 19% by weight of the solids. At that point the water injection was stopped.

This water injection prevented both the shut-down of the process and the possible loss of considerable defluorinated product.

What is claimed is:

1. In the process for preparing defluorinated phosphate rock granules from fluorine-containing phosphate rock which comprises the steps:

(a) admixing fluorine-containing phosphate rock, phosphoric acid, sodium carbonate, and water to form a non-granulated feed slurry;

(b) forming granules in a granulation zone from said non-granulated feed slurry;

(c) drying said granules in a drying zone;

(d) classifying said dried granules to form a product fraction, an over-size fraction, and a fines fraction of said granules;

(e) crushing said over-size fraction and recycling said crushed over-size fraction, said fines fraction and from 0% to about 95% by weight of said product fraction back to step (b);

(f) heating the unrecycled product fraction to defluorinate said fluorine-containing phosphate rock contained therein without fusion;

(g) recovering said defluorinated phosphate rock granules; and (h) wherein more than about 20% by weight of said dried granules discharged from said drying zone are less than about 20 mesh in size, the improvement which comprises:

adding an aqueous solution to said granulation zone in a proportion equivalent to from about 5% to about 30% by volume of said non-granulated feed slurry fed to said granulation zone.

2. The process of claim 1 wherein said aqueous solution is added directly to said granulation zone.

3. The process of claim 1 wherein said aqueous solution is added to said non-granulated feed slurry.

4. The process of claim 1 wherein said aqueous solution contains water-soluble salts or compounds.

5. The process of claim 1 wherein said aqueous solution consists of essentially water.

6. The process of claim 5 wherein the amount of water added is from about 10% to about 20% by volume of the non-granulated feed slurry.

7. The process of claim 6 wherein forming said non-granulated feed slurry, lime is admixed therein.

8. The process of claim 7 wherein said lime is admixed with said phosphoric acid to form a lime-acid slurry and said lime-acid slurry is mixed with the other components of said non-granulated feed slurry.

* * * * *